United States Patent

Deiner et al.

[11] 3,903,123
[45] Sept. 2, 1975

[54] FLUORINE-CONTAINING ORGANOPOLYSILOXANES, PROCESS FOR THEIR MANUFACTURE, AND THEIR USE

[75] Inventors: Hans Deiner, Hainhofen; Franz Mosch, Diedorf; Bernhard Sandner, Biburg; Willy Bernheim, Diedorf, all of Germany

[73] Assignee: Ciba-Geigy AG, Basel, Switzerland

[22] Filed: Dec. 7, 1973

[21] Appl. No.: 422,821

[30] Foreign Application Priority Data
Dec. 22, 1972 Switzerland.................. 18726/72

[52] U.S. Cl. .................. 260/448.2 N; 260/448.2 E; 260/448.8 R; 260/405.5; 260/404; 260/407; 260/408; 252/8.1; 252/8.7; 252/8.7 S; 252/8.9

[51] Int. Cl.² .... C07F 7/02; C07F 7/08; C07F 7/10; C07F 7/18

[58] Field of Search ........... 260/448.2 N, 448.8 R, 260/448.2 E, 405.5, 407, 408, 404

[56] References Cited
UNITED STATES PATENTS
3,597,457  8/1971  Robinson et al. ......... 260/448.2 N X
3,789,252  3/1974  Nitzsche et al. ............... 260/448.2 E

*Primary Examiner*—Paul F. Shaver
*Attorney, Agent, or Firm*—Joseph G. Kolodny; Prabodh I. Almaula; Edward McC. Roberts

[57] ABSTRACT

New fluorine-containing organopolysiloxanes are provided which are obtained by reaction in known manner of organopolysiloxanes which contain hydrogen atoms bonded to silicon, a perfluoroalkyl compound of the formula

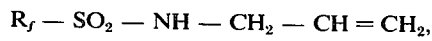

$$R_f - SO_2 - NH - CH_2 - CH = CH_2,$$

wherein $R_f$ represents perfluoroalkyl with 6 to 14 carbon atoms, and optionally a fluorine-free vinyl monomer. These new addition products are useful as oil- and water repellents for fibrous textile materials.

18 Claims, No Drawings

FLUORINE-CONTAINING ORGANOPOLYSILOXANES, PROCESS FOR THEIR MANUFACTURE, AND THEIR USE

It is known to treat fibre material, in particular textiles, with compounds which contain a perfluoroalkyl radical in order to impart oil and water repellent properties to the treated materials. Homopolymers of perfluoroalkylsulphonamides which contain a polymerisable group have proved particularly satisfactory for this purpose. The polymers of acrylic and methacrylic esters of perfluoroalkyl-sulphonamidoalkanols may be cited here as examples. Copolymers of such fluorine compounds with fluorine-free ethylenically unsaturated compounds are also used for the purpose.

The application of these polymers, however, possesses the disadvantage that the oil and water repellency is not satisfactory in every case, so that additional assistants are required which reinforce the water repellent and oil repellent action. Moreover, the handle of fabrics treated with such fluorine polymers is impaired.

On the other hand, it is known to treat fibre materials with organopolysiloxanes in order to render them hydrophobic and simultaneously to impart to them a pleasing, soft handle.

If a combination of such fluorine compounds with organopolysiloxanes conventionally employed in the textile industry is used for treating textiles to increase the water repellent effect, then the desired oil repellency is greatly impaired and as a rule is even lost completely.

It is also known that it is possible to combine additively N-allyl-perfluoroalkane-sulphonic acid amides in known manner with alkylchlorosilanes. Subsequent hydrolysis of the silane yields organopolysiloxanes of low molecular weight and with predominantly cyclic structure. These organopolysiloxanes are used for treating windscreens so as to make them hydrophobic in transparent manner. If these products are applied to textiles, they produce only unsatisfactory oil and water repellent properties.

The present invention provides fluorine-containing organopolysiloxanes which are obtained by reaction in known manner of a. organopolysiloxanes which contain hydrogen atoms bonded to silicon,
b. a perfluoroalkyl compound of the formula (I) $R_f - SO_2 - NH - CH_2 - CH = CH_2$, wherein $R_f$ represents perfluoroalkyl with 6 to 14 carbon atoms, and optionally
c. a fluorine-free vinyl monomer.

Provided they contain hydrogen atoms bonded to silicon, the organopolysiloxanes are the conventional products used in the textile industry.

Surprisingly, these addition products effect on fibre materials outstanding oil and water repellent properties which are fast to washing and cleaning. It is to be particularly emphasised that, compared with the fluorine polymers cited at the outset, the oil repellency is in addition substantially improved when the perfluoroalkyl radical has the same chain length. Furthermore, the handle of the fibre materials is favourably influenced.

The application also provides a process for the manufacture of fluorine-containing organopolysiloxanes, wherein a. organopolysiloxanes which contain hydrogen atoms bonded to silicon are reacted in known manner with b. a perfluoroalkyl compound of the formula $R_f - SO_2 - NH - CH_2 - CH = CH_2$ wherein $R_f$ represents perfluoroalkyl with 6 to 14, preferably 8 to 10, carbon atoms, and optionally
c. simultaneously or successively, in optional sequence, with a fluorine-free vinyl monomer.

A particular embodiment of the invention consists in combining additively with the organopolysiloxanes, together or in succession in optional sequence, fluorine-free vinyl monomers with the compounds of the formula I. Such coaddition products yield on fibre materials in addition an improved water repellency.

Curiously, the addition products of compounds of the formula I, in which the hydrogen atom bonded to nitrogen is replaced by a lower alkyl radical, effect only insufficient oil repellency when applied to fibre material.

These observations must be regarded as all the more surprising because, in general, N-alkyl-N-perfluoroalkylsulphonamide derivatives are used as starting compounds in the above mentioned polymers and also in the cited organopolysiloxanes used for treating windscreens.

As has already been mentioned, the compounds manufactured in this manner are used for treating fibre materials in order to impart to them oil repellant and water repellant properties which are superior to the prior art cited at the outset, especially with respect to the oil repellency and to the fastness to washing and cleaning. The addition of further assistants which increase the water repellency is in principle unnecessary, but is advantageous above all in the treatment of textiles.

Fibre material is to be understood as meaning in this context paper, leather, and, in particular, textiles in the form of woven and knitted fabrics and also non-wovens made from natural and/or synthetic fibres.

The compounds of the formula I are known, for example, from British Pat. No. 818,756. In particular, they have the formula $CF_3 - (CF_2)_n - SO_2 - NH - CH_2 - CH = CH_2$, wherein $n$ is a whole number from 7 to 11, preferably from 7 to 9.

Of the fluorine-free vinyl monomers there may be cited the following examples.

a. vinyl ethers, e.g. alkylvinyl ethers, such as methylvinyl ether, isopropyl-vinyl ether, isobutyl-vinyl ether, vinyl-2-methoxyethyl ether, n-propyl-vinyl ether, tert. butyl-vinyl ether, isoamyl-vinyl ether, n-hexyl-vinyl ether, w-ethylbutylvinyl ether, diisopropylmethyl-vinyl ether, 1-methyl-heptylvinyl ether, n-octyl-vinyl ether, n-decyl-vinyl ether, n-tetradecyl-vinyl ether, and n-octadecyl-vinyl ether, also the vinyl ethers of the following aminoalcohols: ethanolaminevinyl ether, 2-dimethylaminoethanol-vinyl ether, N-hydroxyethyl-m-toluidine-vinyl ether, hydroxyethylbutyl-anilinevinyl ether and β-piperidinoethanol-vinyl ether and the like.

It is also possible to use γ-substituted ethers, e.g. α-methyl-vinyl-methyl ether, α-methylvinyl-ethyl ether, α-amylvinylmethyl ether, and α-phenylvinylethyl ether; alicyclic and aralkylvinyl ethers, e.g. cyclohexanol-vinyl ether, menthol-vinyl ether, carvacrolvinyl ether, benzylalcoholvinyl ether, β-phenylethanolvinyl ether, tetrahydronaphtholvinyl ether, β-decahydronaphthol-vinyl ether, methylphenylcarbinol-vinyl ether, butyl-cyclohexanol-vinyl ether and dihydroabietinol-vinyl ether, as well as vinylaryl ethers, e.g. vinylphenyl ether, α-bromovinylphenyl ether, α-phenylvinylphenyl ether, vinyl-m-cresyl ether, α-methylvinyl-p-cresyl ether, vinyl-p-chlorophenyl ether, vinyl-2,4,6-trichlorophenyl ether, and vinyl-α-naphthyl ether.

Preferred vinyl ethers are those with about 8 to 18 carbon atoms in the radical which is substituted at the vinyl ether group, e.g. n-octyldecyl-vinyl ether.

b. β-olefines, e.g. propylene, butylene, and, in particular, straight-chain or branched α-olefines with 6 to 18, preferably 6 to 10, carbon atoms.

c. Vinyl esters of aliphatic straight-chain or branched acids with at least 6 carbon atoms, e.g. vinyl caprylate, vinyl pelargonate, vinyl caprate, vinyl laurate, vinyl myristate, vinyl palmitate, vinyl stearate, vinyl oleate, and vinyl linoleate. Of the branched acids there may be cited the secondary and tertiary synthetic fatty acids with 9 to 11 carbon atoms.

d. Aromatic vinyl compounds, e.g. o-methyl-styrene, p-methylstyrene, 3,4-dimethyl-styrene, 2,4,6-trimethyl-styrene, m-ethyl-styrene, 2,5-diethyl-styrene, p-butyl-styrene, m-tert. butyl-styrene, p-benzyl-styrene, o-methoxy-styrene, p-methoxy-styrene, 6-methoxy-3-methyl-styrene, 2,6-dimethoxy-styrene and 2-methoxy-5-isopropyl-styrene; derivatives of α-methyl-styrene, e.g. 4-chloro-α-methyl-styrene, 3,4-dimethyl-α-methyl-styrene, 3-bromo-2-methyl-α-methyl styrene and 2,5-dichloro-α-methyl-styrene; chlorostyrene derivatives, e.g. m-chlorostyrene, 2,3-dichlorostyrene, 3,4-dichlorostyrene, trichlorostyrene and pentachlorostyrene; bromostyrene derivatives, e.g. p-bromostyrene; other styrene derivatives, e.g. p-formyl-styrene, the methyl ester of p-vinylbenzoic acid, p-vinylbenzyl alcohol, 1,4-dimethyl-2-hydroxy-styrene, 3,5-dibromo-4-hydroxy-styrene, 2-nitro-4-isopropyl-styrene, p-N,N-dimethylamino-styrene, N-(vinylbenzyl)-pyrrolidine and sulphonamidostyrene; vinyl derivatives of biphenyl, naphthalene and related aromatic compounds, e.g. 4-chloro-4'-vinylbiphenyl, o-isopropenylbiphenyl, p-vinyldiphenyl oxide, 4-chloro-1-vinylnaphthalene, 1-chloro-4-vinylnaphthalene and 1-vinylacinaphthalene; vinyl furane, vinyl benzofurane and vinyl pyridine, e.g. 2-vinyl-dibenzofurane, 5-ethyl-2-vinylthiophene, 5-chloro-2-vinyl-thiophene, 3,4,5-trichloro-2-vinyl-thiophene and 2-vinyl-dibenzothiophene, but especially styrene.

e. Vinyl halides, e.g. vinyl chloride, and vinylidene chloride.

f. Allyl esters and allyl ethers, e.g. allyl acetate and allyl glycidyl ether.

Suitable organopolysiloxanes which contain hydrogen atoms bonded to silicon are particular the known alkylhydrogen polysiloxanes, preferably methyl- or ethylhydrogen polysiloxanes. But it is also possible to manufacture organopolysiloxanes by hydrolysing together silanes which contain a hydrogen atom bonded to silicon with silanes which contain no hydrogen bonded to silicon, and by further reacting the resulting cohydrolysates, which can also have a high degree of polymerisation and consequently possess a high viscosity, by the process according to the invention. Besides the alkyl groups, the polysiloxanes used can of course also contain e.g. aryl groups, for example phenyl groups. Moreover, those compounds are also useful which additionally contain in the terminal position reactive groups, such as OH groups.

The polysiloxanes to be used can have a viscosity from 1 to 1,000, preferably from 10 to 300, c St. at 20°C. These can be illustrated by the formulae

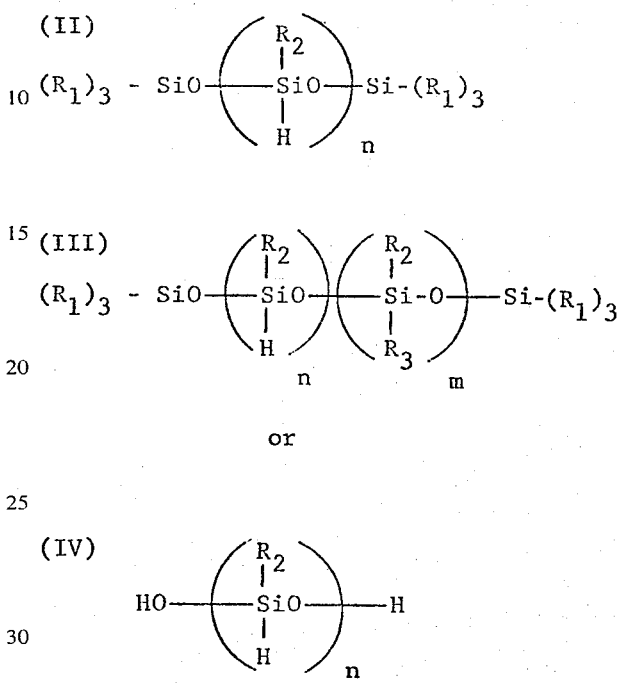

wherein $R_1$ represents alkyl with 1 to 4 carbon atoms, $R_2$ and $R_3$ represent alkyl with 1 to 4 carbon atoms, $R_2$ and $R_3$ represent alkyl with 1 to 4 carbon atoms or phenyl, and n or (n+m) is 2 to 300.

Preferred polysiloxanes are those in which $R_1$ represents methyl and ethyl and $R_2$ represents methyl, alkyl or phenyl, and $n$ or ($n+m$) is 25 to 200. Particularly suitable is hydrogen methyl polysiloxane with a viscosity of 20 to 40 centistokes/20°C or a polysiloxane from dimethyl siloxane and hydrogen methyl siloxane components with a viscosity of 200 centistokes at 20°C. The addition of the compounds I and of the fluorine-free monomers takes place in known manner.

For example, the compound of the formula I is added to the organopolysiloxane. In doine so, it has proved advantageous to choose the ratio of the compound of the formula I to organopolysiloxanes in such a manner that about 1 to 5, in particular 1 to 3, gram atoms of hydrogen atoms bonded to silicon of the organopolysiloxane are available for 1 mol of the compound of the formula I. The inhomogeneous mixture is heated to about 150°C and then hexachloroplatinic acid ($H_2PtCl_6 \cdot 6 H_2O$) is added as catalyst in an amount of 1.0 to 5.0 $\cdot 10^{-4}$ mols per mol of fluorine compound in the form of an approximately 0.5 percent solution in a suitable solvent, e.g. isobutanol. Accompanied by vigorous heat of reaction, a clear, homogeneous end product forms. After cooling to about 100°C or below, a suitable solvent is added, e.g. benzotrifluoride, xylene hexafluoride, trifluorotrichloroethane, tetrafluorodichloroethane, acetone, or dioxane.

The reaction is carried out preferably in a sufficiently high-boiling inert solvent. By this means, a local overheating during the exothermic reaction is avoided which can lead to a condensation of the hydrogen alkyl siloxane. Polyalkylbenzenes and white spirit have proved particularly suitable solvents.

The resulting addition product is advantageously purified before it is used. The most simple way is by reprecipitation with a suitable solvent, such as trichloroethylene or tetrachloroethylene. White spirit and xylene are also suitable.

The procedure is that the solution of the addition product, which is cooled to about 40°C, is poured with stirring in a thin jet into a fairly substantial amount of solvent, in the process of which the addition product is precipitated in finely divided form and can then be filtered off.

The resulting product is further processed by taking it up in one of the solvents mentioned hereinbefore, e.g. benzotrifluoride, and bringing it to the desired concentration.

As has been mentioned already, fluorine-free vinyl monomers can additionally be reacted with the H-alkylpolysiloxanes. The addition can be effected together with the fluorine product or successively, whereby the following combinations are possible:

1. addition of compound I and subsequent addition of the comonomer
2. addition of the comonomer and subsequent addition of compound I
3. simultaneous addition of the fluorine compound I and of the comonomer
4. initial introduction of the monomers and subsequent addition of the H-alkylpolysiloxane.

Procedure I is preferred. A maximum amount of 3 mols of fluorine-free monomers is used for each mol of the fluorine-containing monomer. Preferably the fluorine-free and the fluorine-containing monomers are reacted with the polysiloxane in the ratio 1:1, with the ratio of the compound I to the organopolysiloxane being so chosen that in particular 2 to 3 gram atoms of hydrogen atoms bonded to silicon of the organopolysiloxane are available for 1 mol of the compound of the formula I, i.e. the fluorine-free monomer is additively reacted with the organopolysiloxane.

The resulting addition products can be used in the form of solutions or dispersions.

The emulsifying is effected in conventional manner, wherein the addition product, in the form of a solution in a suitable organic, water-insoluble solvent with the addition of emulsifiers, is converted into aqueous emulsions. The emulsifiers are known and as such there are used: polyvinyl alcohol in aqueous solution, ethoxylated fatty acid amides and ethoxylated fatty amines also in the form of their salts with low molecular organic acids or mineral acids, and quaternary ammonium compounds, e.g. octadecyloxymethylpyridinium chloride. These emulsifiers are used chiefly for emulsifying organopolysiloxanes (cf. for example German Pat. No. 1,060,347 and German Offenlegungsschriften 1,917,701 and 2,032,381). The emulsifiers are used in conventional amounts of 2 to 20, in particular 6 to 15, percent by weight, based on the adduct to be emulsified.

Further conventional assistants used in the textile industry can be added to both the organic solutions and to the aqueous emulsions. To be particularly mentioned here are the agents with which the crease resistance can be improved. Moreover, it is also possible to add so-called extenders to further improve above all the water repellent effects. Suitable extenders, i.e. substances which improve the oil and/or water repellency and furthermore make possible a reduction of the fluorine chemicals are e.g. the fatty modified synthetic resins manufactured according to German Pat. No. 1,223,874 or in similar manner and the known zirconium-paraffin emulsions.

EXAMPLE 1

53.9 g (0.1 mol) of N-allyl-perfluorooctylsulphonamide and 6 g (0.1 mol) of methyl hydrogen polysiloxane (viscosity 30 cst at 20°C) are heated together to 140°C with stirring in a three-necked flask equipped with stirrer, thermometer, reflux cooler, and drip funnel. At this temperature, 3 ml of hexachloroplatinic acid solution (0.5 percent $H_2(PtCl_6) \cdot 6H_2O$ dissolved in isobutanol) are added (corresponds to $2.9.10^{-4}$ mols of $H_2(PtCl_6) \cdot 6H_2O$ per mol of fluorine compound). The inhomogeneous mixture reacts with brief foaming to form a product which at this temperature is clear to medium brown and slightly viscous, the temperature rising to about 175°–180°C. Upon termination of the addition reaction, stirring is continued for 15 to 20 minutes at 170°C and the batch is then cooled to 100°C. 100 g of benzotrifluoride are added at this temperature and the mixture is cooled to 40°C. Subsequently, the still warm, clear solution is poured in a thin jet into 2.5 litres of tetrachloroethylene of 20°C, whereupon the addition product precipitates in finely divided form. Filtration and drying yields 46.7 g (78 percent of theory) of a greyish-brown residue. The substance is subsequently disolved in 121.3 g of benzotrifluoride to form a solution which contains 27.6 percent of dry solids and about 15 percent of fluorine.

EXAMPLE 2

63.9 g (0.1 mol) of N-allyl-perfluorooctyldecylsulphonamide and 24 g (0.4 mol) of methyl hydrogen polysiloxane (viscosity vid. Example 1) are heated together with 100 g of tetramethylbenzene with fractions of trimethylbenzene (b.p.~182°C) to 150°C in a 500 ml capacity three-necked flask equipped as in Example 1, and at this temperature, 3 ml of the catalyst solution used in Example 1 are added. The clear reaction mixture warms to about 170°C with brief foaming and the adduct precipitates from the solvent in finely divided form. The reaction is continued by heating the contents of the flask to reflux temperature over the course of 15 minutes. The reaction mixture is cooled to 100°C, then 100 g of benzotrifluoride are added and the clear solution is poured at 80°C into 2.5 litres of cold tetrachloroethylene. The precipitated adduct is filtered off and dried to yield 66 g of the desired adduct, which, after it has been taken up in 123 g of benzotrifluoride, yields a solution which contains 34.5 percent of dry solids and about 15 percent of fluorine.

EXAMPLE 3

53.9 g (0.1 mol) of N-allyl-perfluorooctylsulphonamide and 12 g (0.2 mol) of methyl hydrogen polysiloxane (viscosity vid. Ex. 1) are heated in 100 g of tetramethylbenzene with fractions of trimethylbenzene (b.p. 182°C) to 150°C in a 500 ml volume three-necked flask equipped as in Example 1, and then 4 ml of catalyst solution according to Example 1 are added. The clear reaction mixture warms to about 170°C with brief foaming, whereupon the adduct precipitates. After stirring for 15 minutes under reflux, 11.2 g (0.1 mol) of α-olefine (with on average 7-9 carbon atoms, average molecular weight 112) are added. In the course of the further 60 minutes stirring under reflux, the inhomogeneous contents of the flask gradually become deep brown and transparent. After cooling to 100°C and addition of 100 g of benzotrifluoride, reprecipitation from tetrachloroethylene as described in Example 2 is effected to yield a slightly tacky, brown adduct. Yield 69 g (89.5 percent of theory). The adduct is dissolved in 104 g of benzotrifluoride. The technical superiority of the compounds manufactured in this way is illustrated by the following test. The aqueous emulsion is manufactured by the following procedure: 200 g of a 10 percent aqueous polyvinyl alcohol solution (viscosity of the 4 percent solution 25 cP at 20°C; saponification number 140) are diluted with 100 ml of water and 500 g of adduct solution obtained according to this Example are slowly whirled into it. The solution is then homogenised at 20°C and about 250 atmospheres in a high pressure homogeniser. A further 200 ml of water are subsequently added. A piece of cotton poplin fabric (160 g/sq.m) is treated as follows: First, the fabric is impregnated with a liquor of the following composition: 30 g/l of the emulsion manufactured as described hereinabove, 50 g/l of an aqueous emulsion 12 percent paraffin, 2 percent montan wax with m.p. 80°-83°C, acid number = 125, saponification number = 160 and d app. 1.01, and 7 percent hexamethylolmelamine-tetramethyl ether distearic acid ester emulsified with zirconium acetate in known manner), 30 g/l of pentamethylolmelamine-trimethyl ether (in the form of a 60 percent aqueous solution), and 3.5 g/l of zinc nitrate hexahydrate. The fabric is subsequently squeezed to a liquor pick-up of 70 percent, dried at 100°C, and condensed for 4 mins. at 150°C (finish A). For purposes of comparison, the same poplin fabric is treated in the same manner, but on the one hand emulsifying instead of the above addition product, a product manufactured in like manner with the sole use of

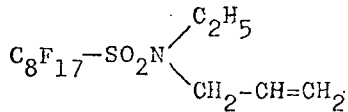

for addition to the polysiloxane (finish B), and on the other hand using 30 g/l of a conventional fluorine polymer in aqueous emulsion (manufactured according to Example 3 of British patent 857 689) (test C). The effects obtained are set forth in the following Table (rain test effects determined according to DIN 53888; oil repellency determined according to AATCC 118-1966 T)

|  | Rain test water absorpton in % | Water repellency | Oil repellency |
|---|---|---|---|
| Finish A (according to the invention) | 7 | 5 – 4 — 4 | 6 – 7 |
| Finish B (comparison test) | 16 | 3 – 2 — 2 | 3 – 2 |
| Test C (prior art) | 6 | 5 – 4 — 4 | 4 – 5 |

EXAMPLE 4

An adduct with properties similar to the one described in Example 3 is obtained by substituting for the α-olefin 19.8 g of a vinyl ester of synthetic fatty acids (app. 10 percent of secondary and app. 90 percent of tertiary acids with on average 10 carbon atoms; saponification number app. 300) and otherwise using the same amounts and reaction conditions. Reprecipitation from trichloroethylene yields 72 g (84 percent of theory) of a brown compound which is dissolved in 109 g of xylene hexafluoride. Composition of the resulting solution: solids: 39.8% and fluorine content: app. 15 percent A finishing test will also illustrate the advance in the art of the manufcatured product. The aqueous emulsion is prepared in the same way as described in Example 3, except that the emulsifier consists of 20 g of a compound of the formula

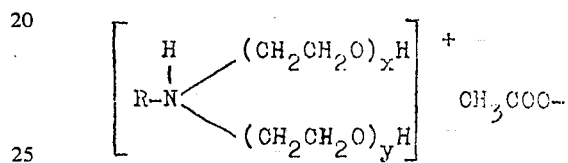

($R =$ on average 16 carbon atoms; $x + y = 10$) dissolved in 280 ml of water. The finish is provided by treating the same fabric as in Example 3, but the following treatment liquor is used: 30 g/l of the emulsion prepared as described hereinabove, 50 g/l of an aqueous emulsion of octadecyloxymethylpyridinium chloride (1%) as emulsifier and a fatty modified melamine resin prepared according to Example 1 of German Pat. No. 1,233,874 (12 percent), 22 g/l of dimethyloldihydroxyethylene urea (in the form of a 44 percent aqueous solution) and 3.5 g/l of zinc nitrate hexahydrate (finish A). For purposes of comparison, the same poplin is again treated in like manner, except that the on the one hand the comparison product indicated in Example 3 is emulsified (finish B), and on the other hand a fluorine polymer in aqueous emulsion (for details vid. Example 3) is used (test C). The resulting effects, determined as in Example 3, are indicated in the following table:

|  | Rain test water absorption in % | Water repellency | Oil repellency |
|---|---|---|---|
| Finish A (according to the invention) | 6,5 | 5 — 5 - 4 | 6 – 7 |
| Finish B (comparison test) | 15 | 3 – 2 — 2 | 3 – 2 |
| Test C (prior art) | 6 | 5 – 4 — 4 | 4 – 5 |

It is not necessary, however, to convert the resulting organic solutions into aqueous emulsions: these solutions can also be used per se.

EXAMPLE 5

29.6 g (0.1 mol) of octadecylvinyl ether are used instead of the α-olefin of Example 3 and furthermore the methyl hydrogen polysiloxane is replaced by 30.0 g of a methyl hydrogen polysiloxane in which the ratio of hydrogen atoms bonded to silicon to methyl groups is 1:3; viscosity 200 cP at 20°C. Reprecipitation yields 75.5 g of a soft, light brown adduct which is taken up in 88.5 g of benzotrifluoride. The resulting solution has 46.1 percent solids content.

EXAMPLE 6

73.9 g (0.1 mol) of N-allyl-perfluorolaurylsulphonamide, 11.2 g (0.1 mole) of α-olefin (details vid. Example 3), 100 g of tetramethylbenzene with fractions of trimethylbenzene (b.p.~182°C) and 3 ml of catalyst solution according to Example 1, are warmed together to reflux temperature in a 500 ml volume three-necked flask equipped as in Example 1. Then 12 g (0.2 mol) of methyl hydrogen polysiloxane (viscosity vid. Example 1) are added dropwise within 10 minutes and stirring is continued for 15 minutes at reflux temperature. Further processing as described in Example 2 is effected and reprecipitation from trichloroethylene yields 59 g of a yellowish brown substance which is dissolved in 88 g of dioxan.

EXAMPLE 7

53.9 g (0.1 mol) of N-allyl-perfluorocaprylsulphonamide and 18 g (0.3 mol) of methyl hydrogen polysiloxane (viscosity vid. Example 1) and 2.5 ml of catalyst solution of Example 1 in 100 g of tetramethylbenzene with fractions of trimethylbenzene (b.p.~182°C) are reacted according to Example 3 in a 500 ml volume three-necked flask equipped according to Example 1. The mixture is stirred for 10 minutes under reflux and then 20 g (0.2 mol) of isobutylvinyl ether are added, whereupon the temperature falls to 160°C. After 30 minutes, the temperature has risen to about 170°C and the batch turns gradually dark brown and clear. Further processing according to Example 2 is effected and reprecipitation from white spirit yields a honey coloured, highly viscous product which is dissolved in 97 g of benzotrifluoride for further processing. (Dry solids content 42.6 percent and fluorine content about 15 percent).

EXAMPLE 8

53.9 g (0.1 mol) of N-allyl-perfluorooctylsulphonamide, 120 g of tetramethylbenzene with fractions of trimethylbenzene (b.p.~182°C) and 66.2 g (0.2 mol) of a 42 percent solution of a silicon polymer in ethyl acetate/xylene are put into a 500 ml volume three-necked flask provided with stirrer, thermometer, drip funnel and distillation cooler with vacuum attachment and condenser flask, and heated to about 130°C with constant stirring and under low vacuum. [The solution of the silicon polymer splits off about 70 ml/g of hydrogen under alkaline reaction and at 25°C exhibits a viscosity of 4500 cP (measured with "Epprecht rotary viscometer" measuring device 40). In addition to the methyl groups, the polymer contains 2 percent of phenyl groups]. After the solvents (ethyl acetate and xylene) have been distilled off in vacuo at about 130°C, the apparatus is deaerated and the distillation cooler is replaced by a reflux cooler. The reaction mixture is further warmed to 150°C and, after addition of 3 ml of the catalyst solution of Example 1, reacted according to Example 2, whereupon a light brown adduct is formed which is insoluble at reflux temperature. The batch is subsequently bulked with benzotrifluoride to a total weight of 216 g to yield a disperse substance which is pasty when cold and which dissolves to a clear solution at about 105°C. Composition: dry solids content 37.8 percent and fluorine content about 15 percent.

We claim:
1. Fluorine-containing organopolysiloxanes which are the reaction products of
   a. organopolysiloxanes in which only hydrogen and alkyl or aryl groups are bonded to silicon, and
   b. a perfluoroalkyl compound of the formula

$$R_f\text{—}SO_2\text{—}NH\text{—}CH_2\text{—}CH=CH_2$$

wherein $R_f$ represents perfluoroalkyl with 6 to 14 carbon atoms.

2. Fluorine-containing organopolysiloxanes according to claim 1, which are the reaction products of from 1 to 5 gram atoms of the organopolysiloxane a) and 1 mol of the perfluoroalkyl compound b).

3. Fluorine-containing organopolysiloxanes which are the reaction products of
   a. organopolysiloxanes in which only hydrogen and alkyl or aryl groups are bonded to silicon,
   b. a perfluoroalkyl compound of the formula $$R_f\text{—}SO_2\text{—}NH\text{—}CH_2\text{—}CH=CH_2$$

wherein $R_f$ represents perfluoroalkyl with 6 to 14 carbon atoms, and
   c. a fluorine-free vinyl monomer.

4. Fluorine-containing organopolysiloxanes according to claim 3 wherein the molar ratio between the perfluoroalkyl compound b) and the vinyl monomer c) is 1:1.

5. Fluorine-containing organopolysiloxanes according to claim 2, wherein the ratio is 2 to 3 gram atoms of said organopolysiloxane a) to 1 mol of said perfluoroalkyl compound b).

6. Fluorine-containing polysiloxanes according to claim 1, wherein the polysiloxanes a) have a viscosity from 1 to 1,000 centistokes at 20°C.

7. Fluorine-containing polysiloxanes according to claim 6, wherein the polysiloxanes a) have the formulae

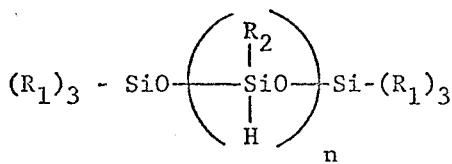

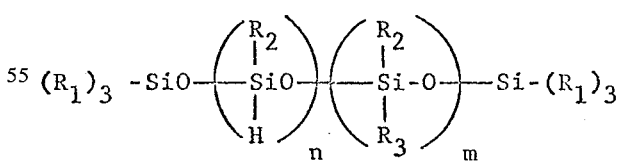

or

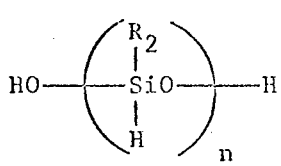

wherein $R_1$ represents alkyl with 1 to 4 carbon atoms, $R_2$ and $R_3$ represent alkyl with 1 to 4 carbon atoms or phenyl, and $n$ or $(n+m)$ is 2 to 300.

8. Fluorine-containing polysiloxanes according to claim 7, wherein in the polysiloxanes a), $R_1$ represents methyl or alkyl, $R_2$ represents methyl, ethyl, or phenyl, and $n$ or $(n+m)$ is 25 to 200.

9. Fluorine-containing polysiloxanes according to claim 6, wherein the polysiloxanes a) are a hydrogen methyl polysiloxane having 20 to 40 centistokes at 20°C and a polysiloxane copolymer of hydrogen methyl siloxane and dimethyl siloxane having 200 centistokes at 20°C.

10. Fluorine-containing organopolysiloxanes according to claim 3, wherein the fluorine-free vinyl polymers are (1) vinyl ethers with 8 to 18 carbon atoms in the radical which is substituted at the vinyl ether group, (2) vinyl esters of aliphatic straight-chain or branched acids with at least 6 carbon atoms, (3) α-olefines with 6 to 18 carbon atoms, (4) allyl ethers or allyl esters, (5) vinyl halides or (6) aromatic vinyl compounds.

11. Fluorine-containing organopolysiloxanes according to claim 10, wherein said polymers are vinyl esters of branched acids with 9 to 11 carbon atoms.

12. Fluorine-containing organopolysiloxanes according to claim 10, wherein said polymers are α-olefines with 6 to 10 carbon atoms.

13. Fluorine-containing organopolysiloxanes according to claim 1, wherein component b) is of the formula $$CF_3 - (CF_2)_n - SO_2 - NH - CH - CH = CH_2$$ wherein $n$ is a whole number from 7 to 11.

14. Fluorine-containing organopolysiloxanes according to claim 3 which are the reaction product of 1 to 5 gram atoms of the organopolysiloxane a), 1 mol of the perfluoroalkyl compound b), and up to 3 mols of the fluorine-free monomer c).

15. Fluorine-containing organopolysiloxanes according to claim 14, which are the reaction product of 1 to 3 gram atoms of hydrogen bonded to silicon of the organopolysiloxane a).

16. Fluorine-containing organopolysiloxanes according to claim 2, which are the reaction product of 1 to 3 gram atoms of hydrogen bonded to silicon of the organopolysiloxane a).

17. Fluorine-containing organopolysiloxanes according to claim 13, wherein $n$ is from 7 to 9.

18. Fluorine-containing polysiloxanes according to claim 6 wherein the polysiloxanes a) has a viscosity from 10 to 300 centistokes at 20°C.

* * * * *